(12) United States Patent
Cope et al.

(10) Patent No.: US 9,426,608 B1
(45) Date of Patent: *Aug. 23, 2016

(54) GPS PROXY FOR LOCATION-UNAWARE DEVICES

(71) Applicant: Sprint Communications Company L.P., Overland Park, KS (US)

(72) Inventors: Warren Bruce Cope, Olathe, KS (US); Shane Robert Werner, Olathe, KS (US); Ahsan Habib, Olathe, KS (US); Douglas Alan Olding, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 55 days.

This patent is subject to a terminal disclaimer.

(21) Appl. No.: 13/900,634

(22) Filed: May 23, 2013

Related U.S. Application Data

(63) Continuation of application No. 11/671,517, filed on Feb. 6, 2007, now Pat. No. 8,483,705.

(51) Int. Cl.
*H04W 24/00* (2009.01)
*H04W 4/02* (2009.01)
*H04W 12/06* (2009.01)
*H04W 64/00* (2009.01)

(52) U.S. Cl.
CPC ............... *H04W 4/02* (2013.01); *H04W 24/00* (2013.01); *H04W 12/06* (2013.01); *H04W 64/00* (2013.01)

(58) Field of Classification Search
USPC .................. 455/411, 457, 456.1, 456.3, 404.2
See application file for complete search history.

(56) References Cited

U.S. PATENT DOCUMENTS

| 6,522,889 | B1 * | 2/2003 | Aarnio | 455/456.5 |
|---|---|---|---|---|
| 6,678,750 | B2 * | 1/2004 | Meade et al. | 710/7 |
| 6,735,444 | B2 * | 5/2004 | Wingren | 455/456.1 |
| 6,741,864 | B2 * | 5/2004 | Wilcock et al. | 455/456.1 |
| 7,050,815 | B2 | 5/2006 | I'Anson et al. | |
| 7,065,370 | B2 * | 6/2006 | Ogaki et al. | 455/457 |
| 7,218,938 | B1 * | 5/2007 | Lau et al. | 455/456.1 |
| 7,313,384 | B1 | 12/2007 | Meenan et al. | |
| 7,502,615 | B2 | 3/2009 | Wilhoite et al. | |
| 7,515,907 | B2 | 4/2009 | Sahim et al. | |

(Continued)

OTHER PUBLICATIONS

Yi-Bing Lin et al, "Implementing Automatic Location Update for Follow-Me Database Using VoIP and Bluetooth Technologies", IEEE Transactions on Computers, 51 (10): pp. 1154-1168 (Oct. 2002).

(Continued)

*Primary Examiner* — Mong-Thuy Tran (57) ABSTRACT

A communication system, media, and methods that proxy location information to location unaware devices are provided. The communication system includes a wireless device that connects to a cellular network and personal area network. The cellular network includes a Global Positioning System server that provides location information based on the current location of the wireless device. A location-unaware device communicates with the wireless device to receive location information via the wireless device when the wireless device is within a predetermined distance of the location-unaware device. The location unaware device connects to a service database to store the location information and queries the service database to complete communication requests generated by a plain-old-telephone-system device that is connects to the location unaware device.

19 Claims, 4 Drawing Sheets

(56) References Cited

U.S. PATENT DOCUMENTS

| | | | |
|---|---|---|---|
| 7,548,197 B2 | 6/2009 | Gruchala et al. | |
| 7,664,106 B2 | 2/2010 | Croak et al. | |
| 8,331,952 B2* | 12/2012 | Pagonis et al. | 455/456.1 |
| 8,365,249 B1 | 1/2013 | Cope et al. | |
| 2002/0004399 A1 | 1/2002 | McDonnell et al. | |
| 2003/0087650 A1* | 5/2003 | Aarnio | G06F 17/289 455/456.3 |
| 2003/0157942 A1* | 8/2003 | Osmo | H04W 4/02 455/456.1 |
| 2004/0033795 A1 | 2/2004 | Walsh et al. | |
| 2004/0198220 A1* | 10/2004 | Whelan et al. | 455/41.1 |
| 2004/0203900 A1 | 10/2004 | Cedervall et al. | |
| 2005/0125493 A1 | 6/2005 | Chaskar et al. | |
| 2005/0153681 A1 | 7/2005 | Hanson | |
| 2005/0186965 A1* | 8/2005 | Pagonis | G01S 5/0072 455/456.1 |
| 2005/0278371 A1 | 12/2005 | Funk et al. | |
| 2006/0121913 A1* | 6/2006 | Lin et al. | 455/456.1 |
| 2006/0198334 A1 | 9/2006 | Civanlar et al. | |
| 2007/0019616 A1* | 1/2007 | Rantapuska et al. | 370/352 |
| 2007/0038860 A1 | 2/2007 | Sawada | |
| 2007/0086579 A1 | 4/2007 | Lorello et al. | |
| 2007/0153986 A1 | 7/2007 | Bloebaum et al. | |
| 2007/0286160 A1 | 12/2007 | Gorti et al. | |
| 2007/0286170 A1 | 12/2007 | Khan et al. | |
| 2008/0039132 A1 | 2/2008 | Delibie et al. | |
| 2008/0090546 A1 | 4/2008 | Dickinson et al. | |
| 2008/0108319 A1 | 5/2008 | Gallagher | |

OTHER PUBLICATIONS

Thomas F. La Porta et al., "Experiences with Network-Based User Agents for Mobile Applications," Mobile Networks and Applications, 3: pp. 123-141, (1998).

Zuji Mao et al, "A Distributed Database Architecture for Global Roaming in Next-Generation Mobile Networks", IEEE/ACM Transactions on Networking, 12(1): pp. 146-160, (Feb. 2004).

Robin Kravets et al, "A Cooperative Approach to User Mobility," ACM Computer Communications Review, vol. 31 (2001).

Non Final Rejection, mailed Sep. 1, 2009, in U.S. Appl. No. 11/671,517.

Non Final Rejection, mailed Mar. 15, 2010, in U.S. Appl. No. 11/671,517.

Final Rejection, mailed Aug. 10, 2010, in U.S. Appl. No. 11/671,517.

Non Final Rejection, mailed Dec. 22, 2010, in U.S. Appl. No. 11/671,517.

Non Final Rejection, mailed Jun. 21, 2011, in U.S. Appl. No. 11/671,517.

Final Rejection, mailed Nov. 21, 2011, in U.S. Appl. No. 11/671,517.

Advisory Action, mailed Feb. 1, 2012, in U.S. Appl. No. 11/671,517.

* cited by examiner

GPS PROXY FOR LOCATION-UNAWARE DEVICES

PRIORITY

This application is a continuation of U.S. application Ser. No. 11/671,517, filed Feb. 6, 2007, which is incorporated in its entirety by reference herein.

INTRODUCTION

Conventionally, a plain-old-telephone system (POTS) operates over circuit-switched networks that includes storage devices that contain static address information associated with each POTS endpoint connected in the circuit-switched network. The POTS endpoints utilize the static address information to communicate with other POTS endpoints. Conventional mobile communication systems include mobile devices that communicate over packet-switched networks having storage devices that store dynamic address information, i.e., Global Positioning System (GPS) coordinates associated with the mobile devices. When the mobile devices move to different areas, the address information is updated to reflect the move. In both the POTS and mobile device system, emergency services, such as ambulance services, police services, and fire department services are reliably provided to the POTS endpoint and the mobile device, respectively, because current address information stored in the storage device associated with the POTS endpoint and the mobile device is accessible by an emergency service dispatcher.

Unlike the POTS devices and conventional mobile devices, VOP (voice over packet) including voice-over-internet-protocol (VOIP) devices complete voice communications over broadband connections, are not location aware, and fail to effectively utilize storage locations that store the address information. In the event of an emergency, the VOIP devices do not reliably provide current address information, especially in situations where the VOIP devices are relocated multiple times and location information is not fresh.

SUMMARY

The present invention is defined by the claims below. Embodiments of the present invention solve at least the above problems by providing communication systems, media, and methods for, among other things, providing location information and responding to emergency service requests. The present invention has several practical applications in the technical arts including authenticating wireless devices, transferring location information to location-unaware devices via wireless devices, and rerouting data communications generated by the wireless devices.

In a first aspect, a set of computer-useable instructions provide location information to location-unaware devices. The location-unaware devices generate a request to retrieve location information and transmit the request to wireless devices. When the wireless devices are within a specified distance of the location-unaware devices, the location-unaware devices initiate a an authentication procedure to authenticate the location-unaware device that generate the request. After the location-unaware devices are authenticated, location information is transmitted to the location-unaware devices via the wireless devices. In turn, the location information is stored in a service database.

In a second aspect, a set of computer-useable instructions route emergency service requests based on location information received at the location-unaware devices. The location-unaware devices are connected to analog devices that generate emergency service requests. In response to the emergency service requests, a service database is traversed to obtain location information for the location-unaware devices. The location information and emergency service request are routed, by the location-unaware devices, to an emergency call center, where a the location information is utilized to locate the analog device.

In a third aspect, a communication system having wireless devices that proxy location information to location-unaware devices. The communication system includes a wireless network that connects the wireless devices and a Global Positioning System (GPS) server, a personal area network that connects the location-unaware devices and the wireless devices, and the Internet, which connects the location-unaware devices to a service database and an emergency call center. When the wireless devices are within a specified distance of the location-unaware devices, data communications generated by the wireless devices may be transferred over the personal area network to the location-unaware device and the data communications may be completed over the Internet via the location-unaware device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide communication systems, media, and methods for proving location information to location-unaware devices. Embodiments of the present invention, may reduce cost, user intervention, and user-generated errors by automatically transmitting location information to the location-unaware devices via wireless devices. The location-unaware devices simply communicate with the wireless devices that receive location information from GPS servers. In turn, the wireless devices transmit location information to the location-unaware devices, when the wireless devices are within a predefined distance of the location-unaware device and the transmitted location information is stored in service databases. Moreover, when an analog device that is connected to a location-unaware device generates emergency service requests the location information transmitted to the location-unaware device is coupled to the emergency service request and routed to an emergency call center for appropriate processing. Accordingly location-information provided to wireless devices is leveraged by the location-unaware devices when, among other things, providing voice communication services to the analog device.

As utilized herein, the term "component" refers to any combination of hardware, software, and firmware. Computer-readable media includes both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Embodiments of the present invention provide a communication system that leverages location information received by wireless device to inform location-unaware devices of a current location. The location information is received by the location-unaware device and may be stored for responding to location-based services, such as receiving location-specific content or responding to emergency services. For instance, image-capture devices embedded with wireless technology may communicate with the wireless devices to determine a current location, and may utilize that location information received from the wireless device to request content, such as image borders or text. The image-capture devices may determine that a current location is a Zoo in San Diego; the current location may be utilized to generate a request to retrieve content, such as image borders that are associated with the San Diego Zoo.

Figure 1:
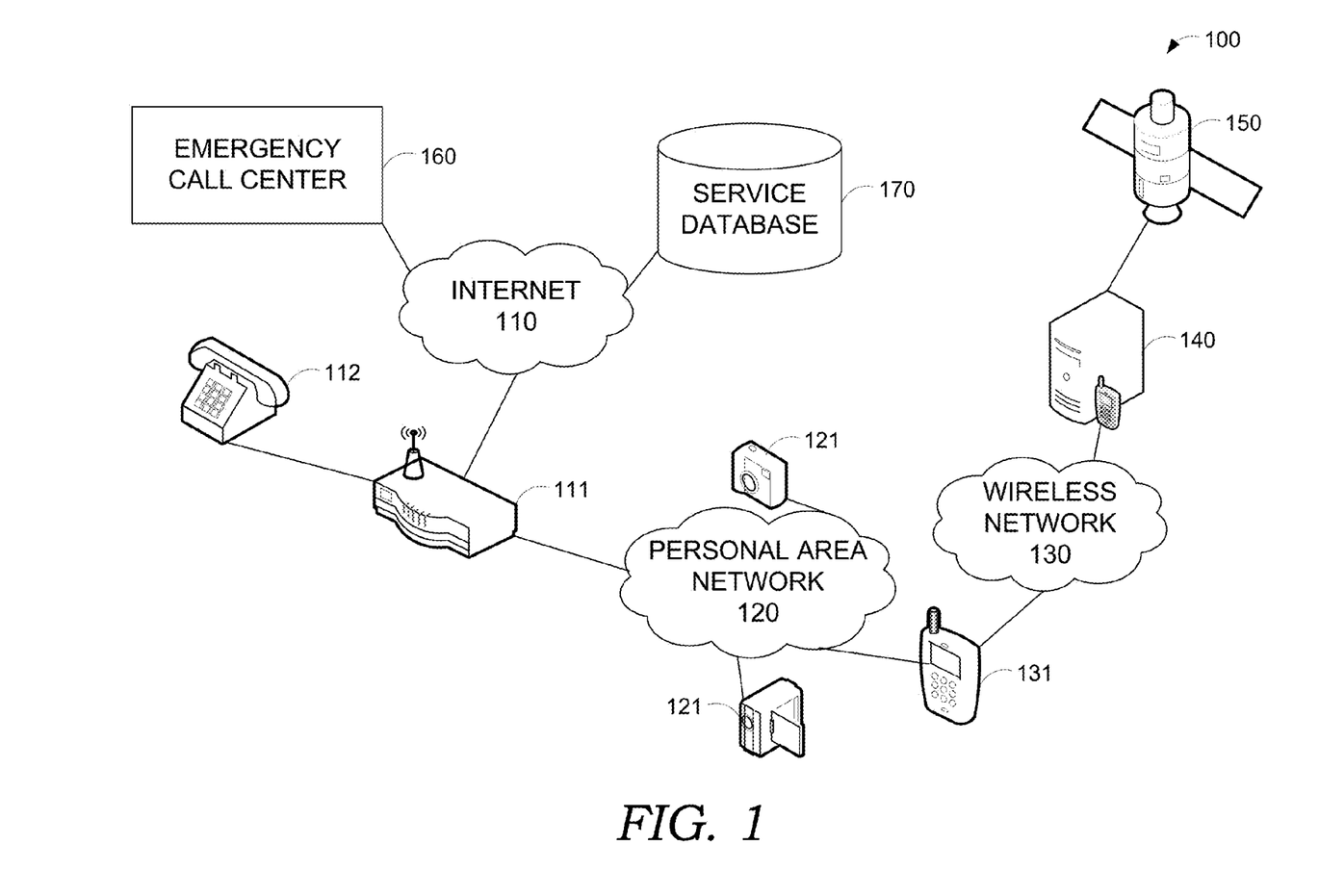
FIG. 1 is a network diagram that illustrates an exemplary operating environment, according to an embodiment of the present invention.

FIG. 1 is a network diagram that illustrates an exemplary operating environment 100, according to an embodiment of the present invention. The operating environment 100 includes, but is not limited to, a collection of networks 110, 120, and 130 and devices 111, 112, 121, 131, 140, 150, 160, and 170 directly or indirectly associated with at least one network in the collection of networks 110, 120, and 130. The collection of networks includes the Internet 110, a personal area network 120, and a wireless network 130. The devices include analog devices 112, location-unaware devices 111, image-capture devices 121, wireless devices 131, GPS servers 140, satellites 150, emergency call centers 160, and service databases 170.

The Internet 110 may connect the location-unaware devices 111 to servers, websites, databases, and call centers. The location-unaware devices 111 may utilize the Internet 110 to connect and exchange data with the emergency call centers 160 and the service databases 170. Additionally, the Internet 110 may be utilized to complete data communication generated by the image-capture devices 121 and wireless devices 131, where the data communications are routed via the location-unaware devices 111 when the wireless devices 131 and image-capture devices 121 are within a predetermined distance of the location-unaware devices 111.

Generally, the location-unaware devices 111 are not aware of their current location until location information is configured and stored in the location-unaware devices 111. In certain embodiments of the invention, the location information is dynamically provided to the location-unaware devices 111 via wireless devices 131 that receive the location information from GPS servers 140. The location-unaware devices 111 may be set top boxes, routers, or modems that perform, among other things, VOIP communications and data communications. The location-unaware devices 111 include an analog interface, i.e., RJ-11, to connect the analog devices 112; an internet interface, i.e., RJ-45, to connect to the Internet 110; and a personal area network interface, i.e., Bluetooth, to connect to the personal area network 120. In an embodiment of the present invention, the analog devices 112 connect to location-unaware devices 111 to initiate and complete telephone calls or emergency service requests utilizing VOIP communications. On the other hand, the wireless devices 131 and image-capture devices 121 may connect to location-unaware devices 111 to initiate and complete data communications, such as content downloads, purchase requests, and text messaging.

The analog devices 112 include POTS devices that are utilized to perform voice communications. The analog devices 112 may include an analog interface, i.e., RJ-11, to connect the location-unaware devices 111. The analog devices 112 may generate voice communications, such as calls, to other analog devices or to wireless devices 131 and emergency service requests directed to emergency call centers 160. The analog devices 112 utilize the location-unaware devices 111 to complete the voice communication via VOIP.

The personal area network 120 may connect the location-unaware devices 111, to among other devices, image capture devices 121 and wireless devices 131. The personal area network 120 is a short distance network that may allow the image capture devices 121 and wireless devices 131 to communicate with the location-unaware device when the image capture devices 121 and wireless devices 131 are within a pre-defined distance. For instance, the pre-defined distance may be 100 meters. The personal area network 120 may be a Universal Serial Bus (USB), Bluetooth, or Zigbee network. In an embodiment of the present invention, data communications associated with requests for location information and requests for content are transmitted over the personal area network to the devices 111, 121, or 131 connected to the personal area network 120.

The image-capture devices 121 may include digital cameras and video cameras that capture events to create digital images and videos. The image capture devices 121 may include a personal area network interface that connects the image capture devices 121 to the personal area network 120. In some embodiments, that image capture devices 121 may communicate with the wireless devices 131 to receive location information. In turn, the image capture devices 121 store the location information and generate requests for location-specific content via the location-unaware devices 111, which completes the request for location-specific content over the Internet 110 and delivers the location-specific content to the image capture device 121.

The wireless network 130 connects the wireless devices 131 to the GPS server 140. In certain embodiments, the wireless network 130 is one of a mobile-communications (sometimes referred to as "cellular") network, a radio frequency network, a Code Division Multiple Access (CDMA) network, or any other type of wireless communication network for wireless devices 131. The wireless network 130 may facilitate the transfer of location information, such as GPS coordinates—longitude and latitude—or address information: city, state, and street data. The wireless devices 131 retrieve the location information from the GPS server 140 over the wireless network 130.

The wireless devices 131 may include cell phones, personal digital assistants, and smartphones that provide mobile voice capabilities to a user. In an embodiment of the present invention, the wireless devices 131 may include a personal area network interface that connects to the personal area network 120 and a wireless network interface that connects to the wireless network 130. The wireless devices 131 periodically receives location information and that enables the wireless network 130 to determine the current location of the wireless device 131 when the wireless device 131 changes location. The wireless devices 131 may initiate data communications or voice communications. When the wireless devices 131 are within a predefined distance of the location-unaware device, the wireless devices 131 may transmit the current location information to the location-unaware device 111. In turn, the location-unaware device 111 checks the location information to determine if a previous location associated with the location-unaware device is substantially different from the received location. In some embodiment, when the wireless devices 131 are within the predefined distance, the wireless devices 131 utilizes the location-unaware devices 111 to initiate and complete data communications generated by the wireless devices 131.

The GPS server 140 is a server that calculates and communicates location information to the wireless device 131. In some embodiment, the GPS server 140 utilizes information gathered from the satellite 150 to calculate the current location of the wireless device 131. The GPS server 140 may check the location information to ensure that the location information is valid. For instance, the GPS server 140 may collect information from multiple satellites 150 to check the information gathered and utilized to calculate location is plausible and realistic. In an embodiment of the present invention, these checks may be utilized in situations where the calculated location indicates that the wireless devices are in the middle of an ocean.

The satellite 150 provides information that is utilized by the GPS server 150 to calculate location information. The satellite 150 may provide the GPS server with information on the wireless devices 131 that are part of the wireless network 131.

The emergency call center 160 may receive voice communications or emergency service requests generated by the analog device 112. The emergency call center 160 processes the voice communication or emergency service requests and provides appropriate emergency services, such as hospital, police or fire services. In an embodiment of the present invention, the voice communication or emergency service request is coupled with location information that corresponds to a current location of, among other things, the location-unaware device connected to the analog device.

The service database 170 is a database that stores, among other things, the location information that corresponds to the location-unaware device 111. The location-unaware device 111 receives the location information via the wireless device 131 and transmits the location information to the service database 170 for storage. The service database 170 may store time stamp information that corresponds to a time the location information was received from location-unaware device 111 or wireless device 131. In some embodiments, the service database 170 includes a history of previous locations associated with each location-unaware device 111. In an alternate embodiment, the service database 170 may be a local database in each location-unaware device 111 that stores the location information provided by each wireless device 131, when the wireless devices 131 are within the predetermine distance.

One of ordinary skill in the art appreciates and understands that the exemplary operating environment 100 has been simplified and that alternate arrangement fall within the scope and spirit of the above description.

Accordingly, embodiments of the present invention provide location-unaware devices with periodic updates on location information when a wireless device is within a predetermined distance. Additionally, when the location-unaware devices are overloaded with data communication requests and wireless devices are within the predetermined distance of the location-unaware devices, in some embodiments, the wireless device may attempt to offset the load on the location-unaware-devices and route data communication requests over the wireless network with priority given to request generated by wireless devices.

In an embodiment of the present invention a wireless device proxies location information generated by a GPS server to location-unaware devices, which automatically register with a service database utilizing the location information. The service database may store the location information and associate it with an analog device's identifier. The analog device identifier may be a telephone number, such as 212-555-0000.

Figure 2:
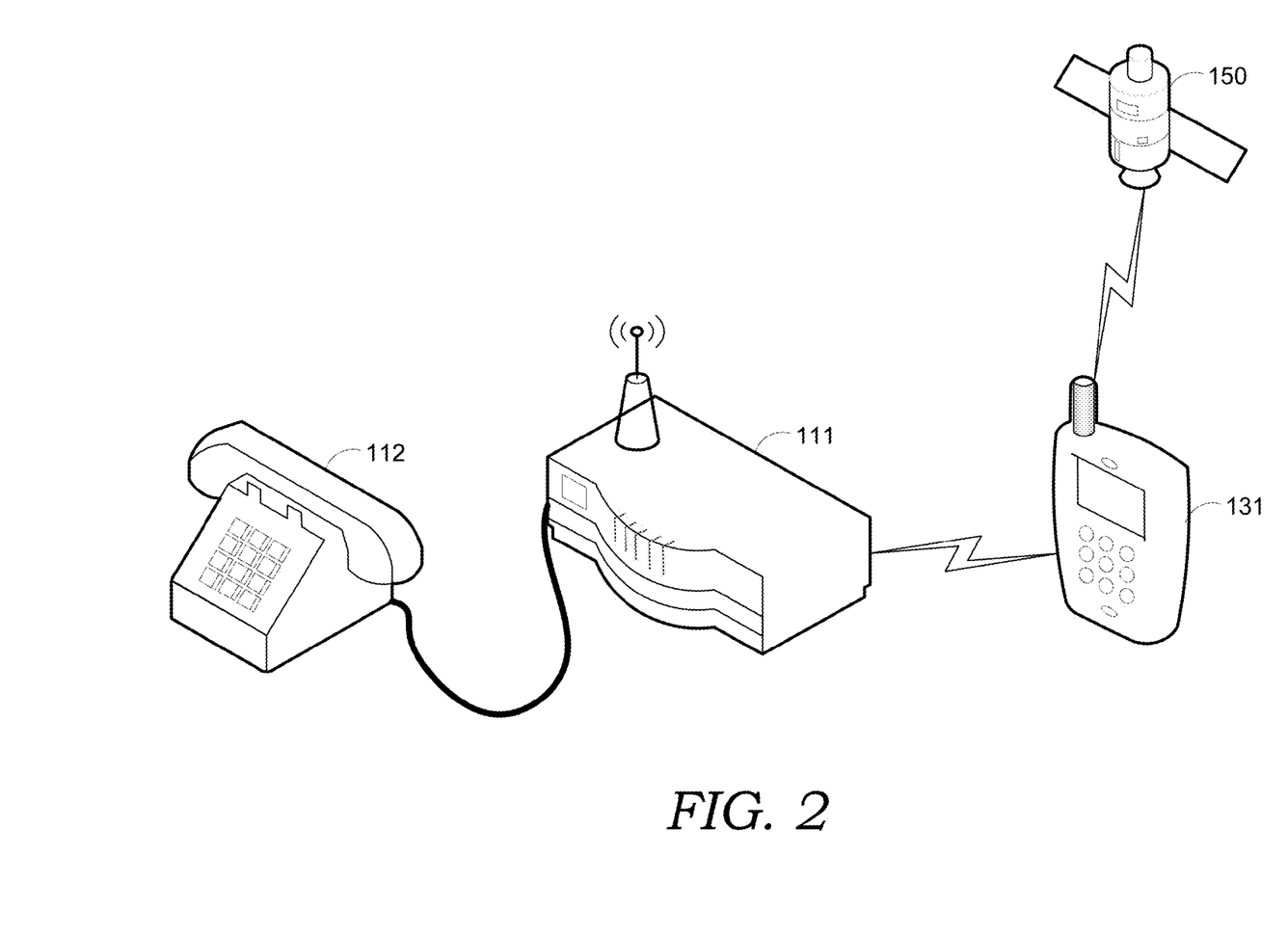
FIG. 2 is a network diagram that illustrates further details of a segment of the exemplary operating environment of FIG. 1, according to an embodiment of the present invention.

FIG. 2 is a network diagram that illustrates further details of a segment of the exemplary operating environment 100 of FIG. 1, according to an embodiment of the present invention. The segment includes an analog device 112, a location-unaware device 111, a wireless device 131, and a satellite 150.

The analog device 112 connects to location-unaware device 111 and generates voice communications. The analog device 112 may be a POTS device that is utilized to complete the voice communications. The analog device does not have information about its current location and depends on the location-unaware device to supplement the voice communications with location information.

The location-unaware device 111 receives location information from the wireless device 131 and stores the location information in a service database. The location-unaware device 111 and wireless device 131 are trusted device that authenticate each other when the wireless device 131 is within a predetermined distance of the location-unaware device 111. Prior to transferring location information to the location-unaware device 111, the wireless device 131 may challenge the location-unaware device 111 for an alphanumeric code, i.e., device class and type, or for a username and password combination. After the location-unaware device 111 successfully provides the alphanumeric code or username and password combination, the wireless device 131 transmits the location information to the location-unaware device 111.

In an embodiment of the present invention, the location-unaware device 111 includes a service database that is a local database, which stores and archives location information. When the location-unaware device 111 is starting up the service database may be empty. Thus, the location-unaware device 111 may utilize the location information to associate a physical address or GPS coordinates with an identifier for the analog device 111 in the service database. The location information stored in the service database may supplement voice communications generated by the analog device 112 with current location information. The location information previously stored in the service database may be updated: when a wireless device 131 moves to a location that is within the predefined distance and the location-unaware device 111 did not move; when another wireless device 131 is within a predefined distance of the location-unaware device 111 and the location-unaware device 111 did not move; or when the location unaware device 111 moves to a new area and a wireless device 131 is within a predetermined distance of the location location-unaware device 111. In some embodiments, the location-unaware device 111 compares the updated location information with previously stored location information to determine whether a substantial change in location occurred. If the updated location information is within a predefined threshold of the previously stored location information, the location-unaware device 111 does not update the service database. However, if the updated location information is not within the predefined threshold of the previously stored location information, the location-unaware device 111 updates the service database with the updated location information. In some embodiments, the predefined threshold is one mile from the previously stored location information. The service database stores correlations between the analog device identifier, i.e., phone number, and the received location information. In some embodiments, when the location-unaware device is physically relocated to a new area, such as a new city, the analog device identifier may also be updated and the location information for the new area is stored in the service database. In certain embodiments of the present invention, the location-unaware device 111 may compare timestamps associated with the previously stored location information and updated location information to determine the freshness of the location information. If the previously stored location information is more than, for example, a week old, the location information may be updated to ensure that the location-unaware device 111 stores the most current location information.

The wireless device 131 is a trusted device that is authenticated by the location-unaware device 111. When the wireless device 131 is within a predefined distance of the location-unaware device 111, the wireless device 131 provides authentication information, such as, an alphanumeric code or a username and password combination. After authenticating the wireless device 131, the location-unaware device 111 may request location information from the wireless device 131. The location information may include regional information, i.e., city name and street name, and coordinate information, i.e., longitude latitude. In some embodiments of the present invention, the wireless device 131 is configured to redirect data communications generated by the wireless device 131 to the location-unaware device 111, when location-unaware device 111 is not overloaded.

The satellite 150 provides the wireless device 131 with location information. The satellite may communicate the location information to the wireless devices 131 on a periodic basis. In some embodiment, a GPS server augments the location information with street information and other location-specific data. In some embodiments, the GPS server may check the location information against a business and home directory listing to ensure that the location-information is associated a real address or location, i.e., business or home.

Accordingly, embodiments of the present invention leverage the location information provided to wireless devices to automatically configure location-unaware devices with location information. The analog device connected to the location-unaware device may initiate and complete VOIP calls, where location information is added to the call by the location-unaware device based on the location information received from the wireless devices.

In an embodiment, the location-unaware device is configured with computer-readable instructions that cause the components on the location-unaware device to authenticate the wireless device and receive location information from the authenticated wireless device. Additionally, the location-unaware device may be configured to receive voice communication requests and augment the voice communication requests with the current location information associated with the analog device and location-unaware device.

Figure 3:
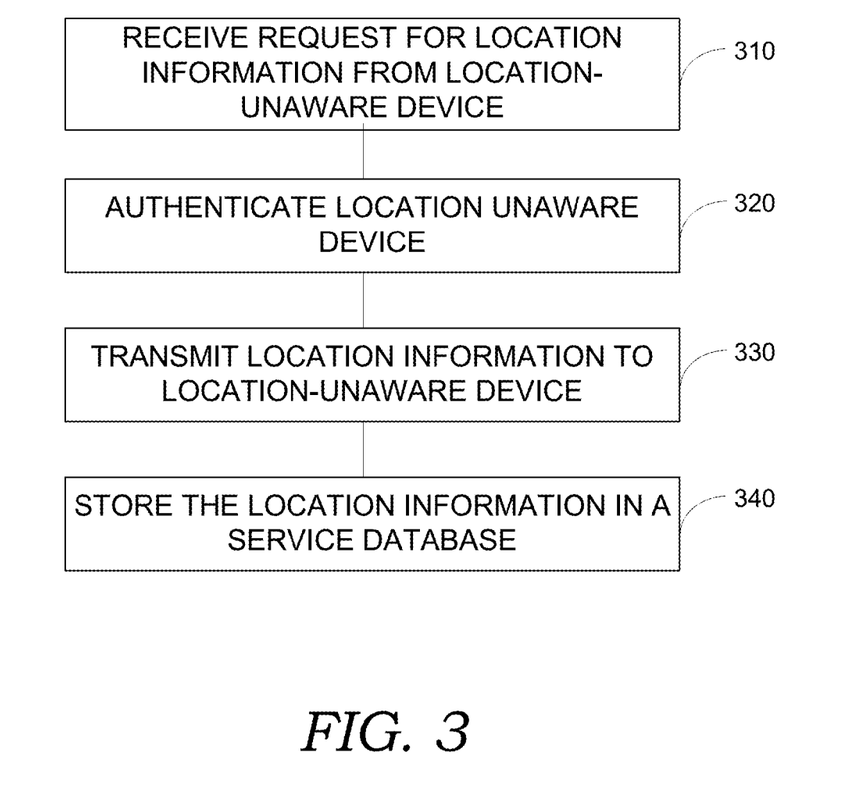
FIG. 3 is a logic diagram that illustrates a method to provide location information to location unaware devices, according to an embodiment of the present invention.

FIG. 3 is a logic diagram that illustrates a method to provide location information to location-unaware devices, according to an embodiment of the present invention. In step 310, a location-unaware device generates a request for location information. The request is transmitted to the wireless device. In step 320, the wireless device authenticates the location-unaware device. In turn, the wireless device transmits the location information to the authenticated location-unaware device, in step 330. In step 340, the location information is stored in a service database.

In some embodiments of the invention, the service database is queried to access location information for an analog device that is associated with the location-unaware device. The voice communications generated by the analog device may be supplemented with the location information. For instance, the location-unaware device may add location information to, among other things, emergency service communications generated by the analog device.

Figure 4:
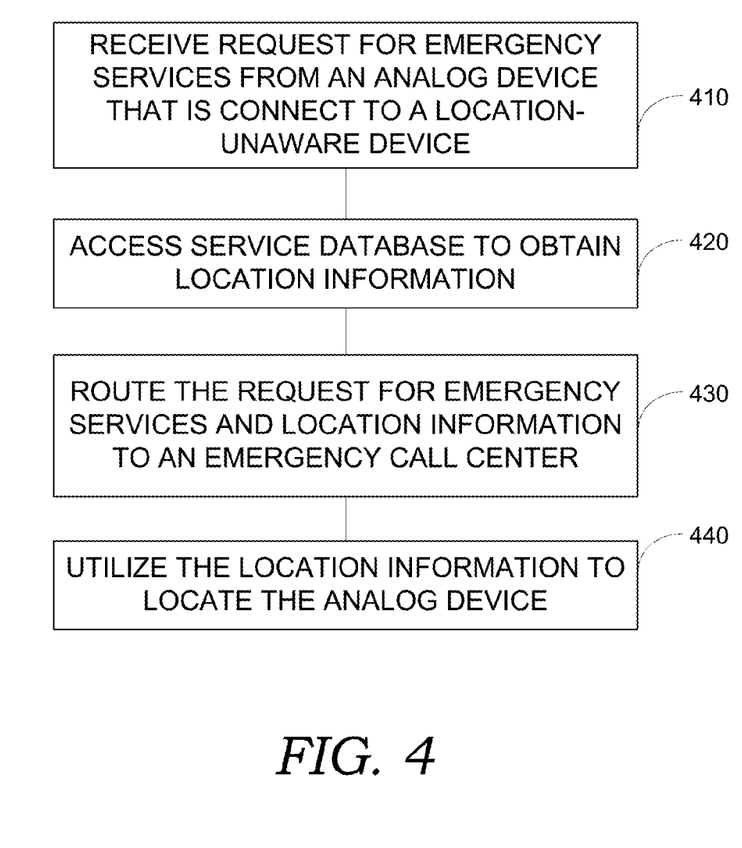
FIG. 4 is a logic diagram that illustrates a method to route emergency service communications via the location-unaware device, according to an embodiment of the present invention.

FIG. 4 is a logic diagram that illustrates a method to route emergency service communications via the location-unaware device, according to an embodiment of the present invention. In step 410, the analog device transmits a request for emergency services to the location-unaware device. In step 420, the location-unaware device accesses a service database to obtain location information associated with the location-unaware device and the analog device. The location-unaware device retrieves the location information and augments the request for emergency services with the location information. In step 430, the location information and the request for emergency service are routed to an emergency call center. In step, 440, the location information is utilized to located the analog device.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-storage media having computer-useable instructions embodied thereon for performing a method of providing location information, the method comprising:

notifying a service database in a location unaware device that an image capture device is within a predetermined distance of the location-unaware device's personal area network;

at the service database, receiving a request for location information from the image-capture device over the personal area network;

authenticating, over the personal area network, the location-unaware device at a wireless device that is within the predetermined distance of the location-unaware device;

updating, over the personal area network, the service database with wireless device location information provided by the wireless device, wherein the wireless device location information is obtained from a global position system; and in response to the request for location information from the image capture device, transmitting, over the personal area network, the wireless device location information stored in the service database to the image-capture device, wherein said location information is included in requests for location-specific content, generated by the image capture device, said requests are routed; over the personal area network; to the location-unaware device, which operates as a proxy to obtain responses to the requests for the location-specific content.

2. The media of claim 1, wherein the image-capture device requests location-specific content to supplement the captured images.

3. The media of claim 1, wherein the location-specific content includes borders or fonts.

4. The media of claim 1, wherein the image-capture devices include digital cameras or video cameras that capture events to create digital images and videos.

5. The media of claim 1, wherein authenticating the location-unaware device includes checking a device class associated with the location-unaware device.

6. The media of claim 1, wherein authenticating the location-unaware device includes receiving at the location-unaware device a challenge from the wireless device.

7. The media of claim 6, wherein the challenge requires the location-unaware device to validate any combination of an alphanumeric code, a username, or password.

8. The media of claim 1, wherein the location information is checked to determine whether the transmitted location information is substantially different from a location previously stored in the service database.

9. The media of claim 8, wherein transmitting location information to the image-capture device such that said location information is stored in the service database comprises generating a timestamp that reflects a date and time of an update to the location information.

10. The media of claim 1, wherein data communications from the wireless device or image-capture device are routed via the location-unaware device when the wireless device and image-capture device are part of location-unaware device's personal area network, said data communications include the requests for location-specific content and the responses to the requests for location-specific content.

11. The media of claim 10, wherein the wireless device offsets data communications from the location-unaware device if the location-unaware device is overloaded with data communications from the wireless device and image-capture device.

12. The media of claim 1, wherein data communications from the wireless device or image-capture device are routed via the location-unaware device when the wireless device and image-capture device are part of location-unaware device's personal area network but the wireless device offsets data communications from the location-unaware device if the location-unaware device is overloaded with data communications from the wireless device and image-capture device.

13. A computer-implemented method of providing location information, the method comprising:
establishing a communication route between an image-capture device and a location-unaware device when the location-unaware device is within a predetermined distance of the image capture device, wherein the image capture device is included in the location-unaware device's personal area network;
at a service database of the location-unaware device, receiving a request for location information from the image-capture device over the personal area network;
authenticating, over the personal area network, the location-unaware device at a wireless device that is within the predetermined distance of the location-unaware device;
updating, over the personal area network, the service database with wireless device location information provided by the wireless device, wherein the wireless device location information is obtained from a global position system; and
in response to the request for location information from the image capture device, transmitting, over the personal area network, the wireless device location information stored in the service database to the image-capture device, wherein said location information is included in requests for location-specific content generated by the image capture device, said requests are transmitted to the location-unaware device, which operates as a proxy to obtain responses to the requests for the location-specific content.

14. The method of claim 13, wherein authenticating the location-unaware device includes checking a device class associated with the location-unaware device.

15. The method of claim 13, wherein authenticating the location-unaware device includes receiving at the location-unaware device a challenge from the wireless device and the challenge requires the location-unaware device to validate any combination of an alphanumeric code, a username, or password.

16. The method of claim 13, wherein data communications from the wireless device or image-capture device are routed via the location-unaware device when the wireless device and image-capture device are part of location-unaware device's personal area network.

17. The method of claim 16, wherein data communications include the requests for location-specific content and the responses to the requests for location-specific content.

18. The method of claim 16, wherein the wireless device offsets data communications from the location-unaware device if the location-unaware device is overloaded with data communications from the wireless device and image-capture device.

19. A computer system for providing location information, the system comprising:
a service database in a location-unaware device that is notified when an image capture device is within a predetermined distance of the location-unaware device's personal area network;
the location-unaware device's personal area network includes a wireless device, the location-unaware device, and the image-capture device, wherein the location-unaware is authenticated, over the personal area network, by the wireless device if it is within the predetermined distance of the location-unaware device;
at the service database, a request for location information is received from the image-capture device over the personal area network, wherein prior to providing a response to the request, the service database is updated, over the personal area network, with wireless device location information provided by the wireless device, such that the wireless device location information is obtained from a global position system, and in the response to the request for location information from the image capture device, providing, over the personal area network, the wireless device location information stored in the service database to the image-capture device; and
the location-unaware device receives, over the personal area network, requests for location-specific content, wherein said requests that are generated by the image capture device and responses to said requests are both proxied by the location-unaware device.

* * * * *